Feb. 11, 1941.         T. A. BRYSON          2,231,052
ELECTRIC POWER DISTRIBUTING SYSTEM
Filed Dec. 2, 1938        2 Sheets-Sheet 1
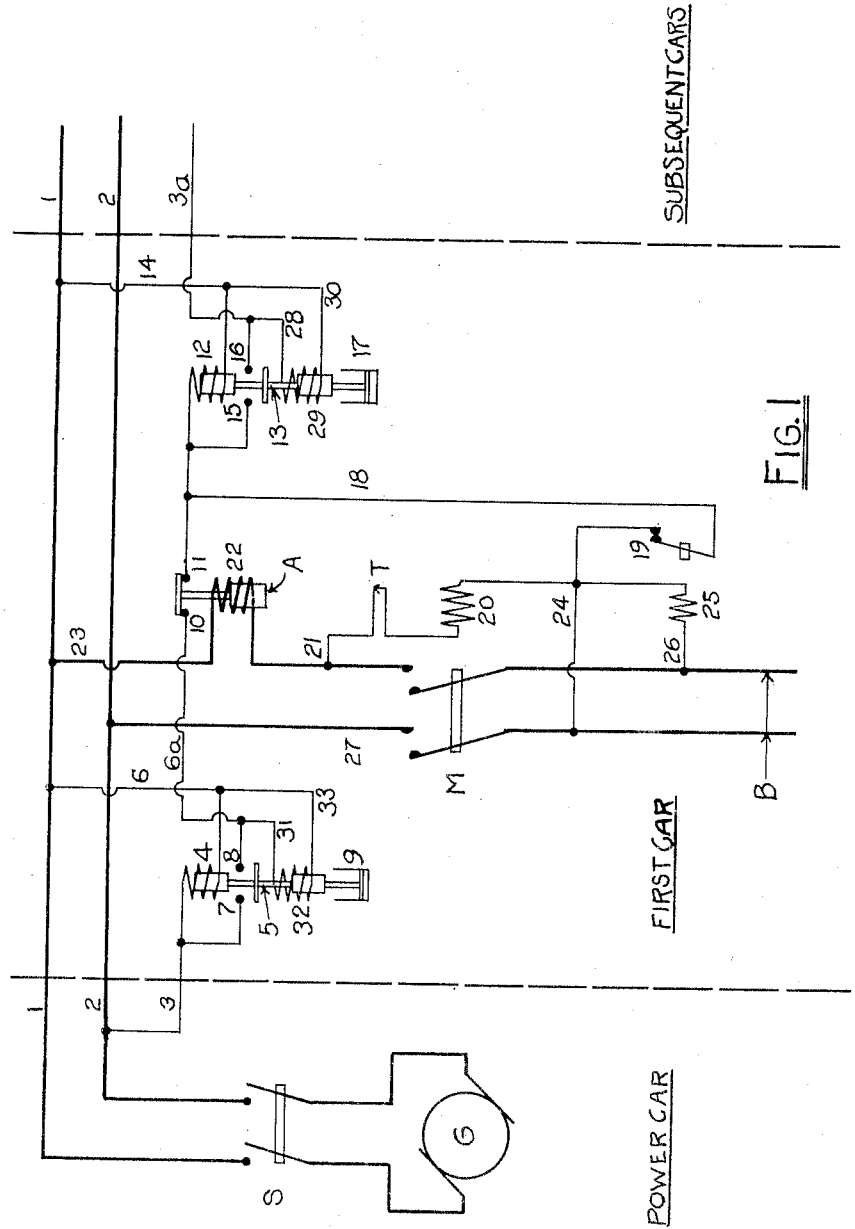
INVENTOR
Tandy A Bryson

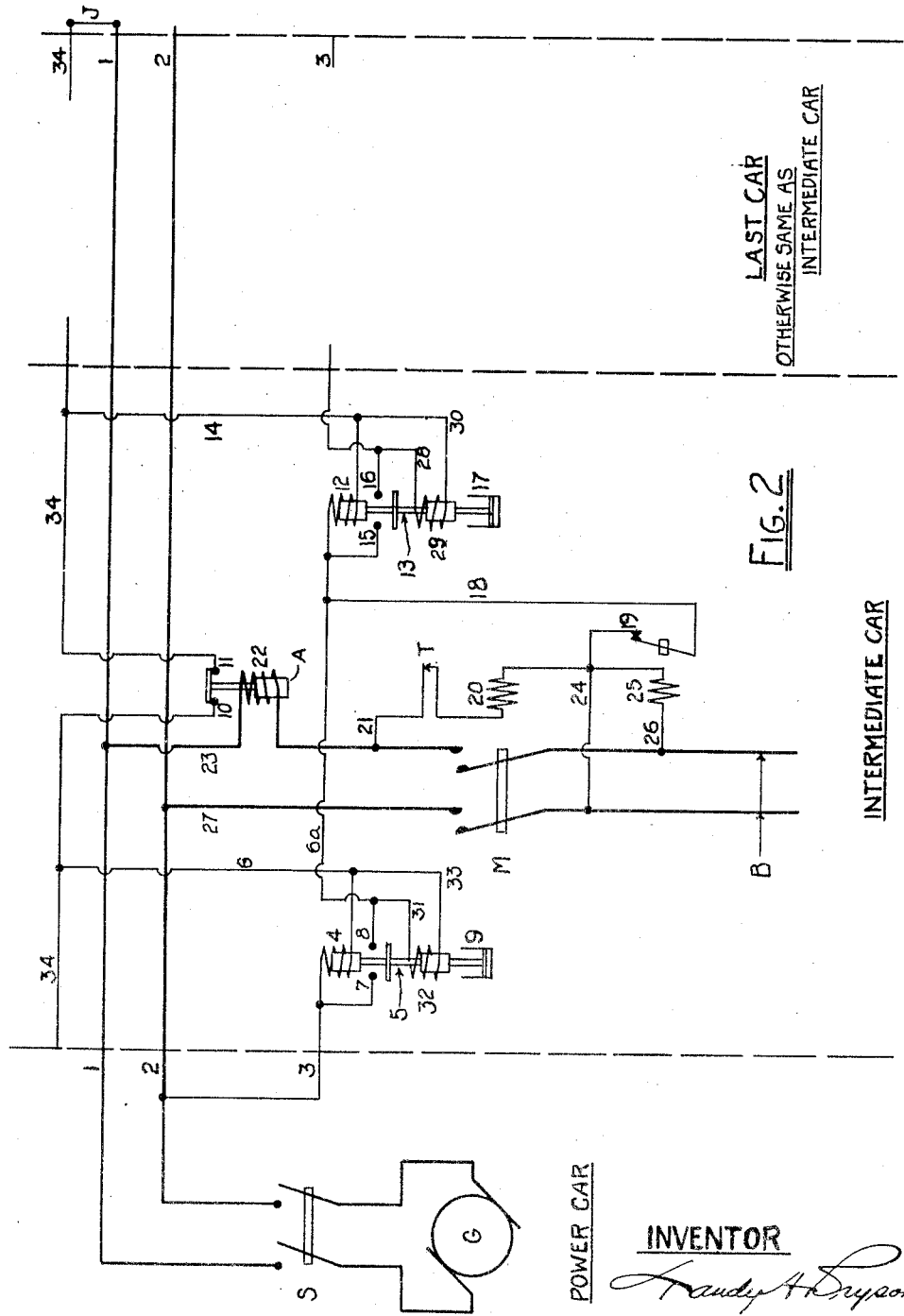

Patented Feb. 11, 1941

2,231,052

UNITED STATES PATENT OFFICE 2,231,052

ELECTRIC POWER DISTRIBUTING SYSTEM

Tandy A. Bryson, Troy, N. Y., assignor of one-half to John H. Brelsford, Troy, N. Y.

Application December 2, 1938, Serial No. 243,581

8 Claims. (Cl. 171—97)

My invention relates to systems for the distribution and control of electric power and more particularly to a novel system and mechanism for controlling the load thrown on an electric feeder having a plurality of branch circuits.

Certain features of the invention are directed to providing a system of electric power distribution whereby the power supplied from a common source to a plurality of power consuming mechanisms such, for example, as a battery of electric motors connected by branch circuits to a common feeder circuit can be controlled so as to regulate the load thrown upon the feeder circuit at any particular time. These features of the invention have for their object the minimizing of the disturbance on the feeder circuit by preventing substantially simultaneous starting of two or more power consuming devices, such as motors, connected to the feeder circuit by respective branch circuits. In accomplishing this object, the invention provides distributing mechanism which automatically insures that no additional branch circuit can be connected and draw the heavy current required for initial energization until the current in a previously-connected branch shall have dropped to its normally-operating or predetermined amount.

I am aware that there have been disclosed other systems which have the object of minimizing the current in the feeder circuit. One of these is disclosed in my Patent 1,802,751 in which this object is accomplished by preventing the connection of additional branch circuits while the feeder circuit current exceeds a predetermined amount. As it will appear below, limitation of the current in the feeder does not serve my purpose; in fact, I wish particularly to avoid this limitation in controlling the progressive connection of additional branch circuits, for reasons to be explained. Other systems interpose a time delay between successive connection of branch circuits; the extent of delay being intended to be sufficient to allow a previously-connected branch to attain normal operating condition. Obviously, to be effective, such interposed delays must be of sufficient extent to include a margin of time beyond that theoretically necessary, merely as a safety measure, whereas I prefer to rely upon means controlled by the current in the last-connected branch; which is to say, at the source of the disturbance, whereby the delay may be measured automatically by the extent of the disturbance.

This invention further provides that the operation of the mechanism controlling the connection of additional branches in no way affects the operation of the branches already connected.

Certain other features of the invention apply to the distribution of power in an articulated system, each section containing one or more branches, in which the sections are successively energized as described above. Provision is made for the addition or removal of sections without affecting the operation of the system. Further, it is provided that the operation of the system will be unaffected by articulating said sections without regard to the orientation thereof with respect to the system.

The system is particularly proposed for use in railroad trains made up of a plurality of cars, the cars containing the branch circuits and the group of cars forming the articulated system; power being supplied from a power car placed (usually) at one end of the group. The above described features of the invention provide for the successive energization of the cars—with particular respect to the motor-driven equipment therein, such as air-conditioning mechanisms, etc.; delaying the successive energization until after the mechanisms in any previously energized car have attained normal operating and current-consuming condition. By thus predicating the progress of energization upon the normal operating condition of a previously energized car, rather than upon the total current in the feeder as provided in my previous invention (Pat. No. 1,802,751), the number of branches (or cars) which may be grouped and served will not be limited by any predetermined setting of a current-limiting device in the feeder circuit as prescribed in that patent. In other words, the present invention does not, by limiting the feeder current to some predetermined amount, limit the number of cars which may be operated at normal power from the power car. The invention protects the feeder circuit from such excessive surges of current as would result if a plurality of cars were energized simultaneously and, for any given number of connected cars, the prevention of more than one surge at a time has the incidental effect of minimizing the load on the feeder circuit. The maximum load to which the feeder circuit can be subjected is a function of the number of cars in the train and can never be greater than that required to initially-energize one car plus the sum of the normal operating loads of all other cars. By thus providing a flexible, rather than a fixed, maximum load on the feeder circuit, there is avoided the possibility that some of the cars may never be energized by reason of the fact that the normal operating loads of a portion of them are sufficient to absorb the predetermined load which may have been set for the system.

Another marked advantage of the "flexible maximum" load on the feeder circuit resides in the fact that current surges are particularly to be minimized. A fixed maximum must be large enough to supply a complete train with operating power. This amount of current can well be greater than that required to initially-energize one car, hence a fixed maximum may be great enough to permit simultaneous energization of two or more cars thus producing a very heavy surge which is much more harmful than an equal load applied gradually.

In some of the other systems proposed for the progressive energization of cars in a train it is assumed that the cars will have a definite orientation with respect to the power car; the electrical system within each car is arranged with the presumption that, in the progressive distribution of energy, the energy will always be received at one selected end of the car and will be passed on to the next car from the other end. The present invention provides symmetry in electrical layout with respect to the ends of the car whereby either end may face the power car without effect upon the operation within the car or at other points of the system. In making up trains of individual cars in railroad yards or in the addition of cars at junction points, the elimination of the need for physical orientation is a great advantage.

It will be understood that the foregoing general description, and the following detailed description as well, are exemplary and explanatory of the invention, but are not restrictive thereof. It will also be understood that the invention is not restricted in application to railroad trains but may be applied to any power distribution system wherein its provision may be desired.

Of the drawings:

Fig. 1 diagrammatically illustrates a simplified and partial embodiment of the invention and, Fig. 2 is an extension of Fig. 1, as will appear from the following description, and illustrates a broader embodiment of the invention.

These figures, together with the description thereof, serve to explain the principles of the present invention.

Referring now to the embodiment as illustrated in Fig. 1, the dashed lines indicate the limits of the electrical system within one of the cars of the train. The power car is shown at the left; subsequent cars to the right of the first car. Progress of energization is from left to right.

In the power car, G represents the generator and S the main switch by which the feeders 1 and 2 are energized. Note that on closing switch S, the feeders, composed of sections corresponding to the cars of the train, are energized throughout the train. Any equipment such as light, storage batteries, etc. in the train which does not require delayed energization in accordance with the object of this invention may be connected directly, if desired, to the feeders independently of the delaying means to be described and may thus be immediately energized. Such connections are omitted herein since they do not form a part of this invention.

On closing switch S, the control line 3 acquires the potential of feeder 2 and it will be observed that the control circuit is completed by the use of feeder 1 as the return lead thereof.

Through the circuit 3, actuating coil 4 of relay 5, and line 6 to feeder 1, the relay 5 is actuated and, after a slight time delay imposed by dash-pot 9, the gap 7—8 is closed and line 6a is energized. Thence, through the closed gap 10—11, coil 12 of relay 13 and line 14 to feeder 1, the relay 13 begins to close the gap 15—16 and thus prepares to energize control line 3a which, in the next car, serves the same purpose as line 3 in the car now being described. But before relay 13 can close gap 15—16 under the slight time delay imposed by dash-pot 17, the circuit 18, closed contactor 19, coil 20 (the latter being the operating coil of magnetic switch M which connects the branch B), through the thermostat T (assumed to be closed), line 21, coil 22 of relay A, and line 23 to feeder 1 acts to move switch M to the closed position thus energizing branch B.

Immediately on energizing branch B, current flows through coil 22 of relay A which is set to open gap 10—11 when this current exceeds the normal operating current of the branch. Relay A holds this gap open until branch B attains normal operating conditions and the current surge incident to the initial energization of the branch has passed.

Immediately upon the closing of switch M, the contactor 19 is opened by the energization of its operating coil 25 through the lines 24 and 26 to the two sides of the branch circuit, but the coil 20 of switch M is not de-energized since it now receives energy through line 24 and switch M will remain closed until coil 20 is de-energized by the opening of thermostat T.

The opening of gap 10—11 by relay A isolates coil 12 of relay 13 from control line 3 and the opening of contactor 19 prevents a feed-back through line 18, hence relay 13 is de-energized before it can close gap 15—16 under the restraint of dash-pot 17. This relay therefore drops back to full-open position and remains so until the current in branch B shall have dropped to normal operating value and allows gap 10—11 to close due to insufficient energization of relay A to hold it open. It follows therefore that line 3a and, consequently, the subsequent cars may not be energized until the surge in the feeder circuit due to the connection of branch B has passed.

It will be noted that relays 5 and 13 are provided respectively with additional coils 32 and 28. The function of these coils is to render the electrical system within the car symmetrical with respect to the ends thereof, whereby the orientation of the car with respect to the train may have no effect upon the operation of the system.

Suppose this car had been placed in the train in a position reversed, or end-for-end, with respect to that shown. The effect would be to exchange the positions of lines 3 and 3a and the effect of this upon the electrical system may be conveniently explained by assuming for the moment that potential in the control line enters at 3a and eventually leaves at 3.

Operation in this case would be as follows:

The circuit 3a, 28, 29, 30, 14 to feeder 1 would, after the slight delay imposed by dash-pot 17, close gap 15—16 and switch M, contactor 19 and relay A would be operated the same as before. Operation of relay A to break gap 10—11 would isolate coil 32 of relay 5 before it could close gap 8—7 and pass potential on to 3. The function, therefore, of the two double relays 5 and 13 is to pass potential with slight time delay in either direction as may be demanded by the orientation of the car and thus to permit the car to be connected in the train with either end nearest the power car without interfering with or in any way modifying the operation of the system.

If, at the time of closing main switch S, all cars demand power as, for example, in a hot train in which all thermostats were closed, the cars will be energized in succession, beginning at the car next to the power car and progressing toward the other end of the train with such delay between the successive steps as required to allow for the dissipation of current surges in the respective branches. To this delay will be added the very slight and practicably inconsiderable time intervals imposed by the relays 5 and 13, each of which being only enough to permit switch M to close and relay A to open—an almost instantaneous operation. The progress of energization is therefore, from all practical viewpoints, solely timed by the rate of dissipation of the successive current surges which may or may not be variable in duration, and is not dependent upon pre-determined time-settings which may or may not coincide with current surge duration. Progress through cars which do not, by a closed thermostat, call for power, is almost instantaneous.

It has been observed that energization progresses from left to right as the train is originally energized. This occasion of original energization particularly demands the advantages of successive energization since at this time all or many cars will likely call for energy. Without such means as are herein disclosed the current surge caused by simultaneous energization would be exceedingly disturbing to the system. As the cars become cooled by the operation of air-conditioning equipment, their respective thermostats will open and de-energize the respective branches until such time that further cooling is demanded. It will be seen from the above description that, once energy has reached the last car through the control line 3, any later-closing thermostat will find power immediately available. In the embodiment of this invention thus far described, the re-energization of any car will automatically de-energize the control line and prevent simultaneous re-energization of any other car further than the one in question from the source of power, but there will be no effect on the control line in cars nearer the source. Closure of a thermostat in a car nearer the power car, before this last surge were dissipated, would effect a combination of surges; hence the arrangement of Fig. 1 does not insure complete protection from this contingency after the first energization has been accomplished. While the chance is very remote that two or more cars may first be cooled and then regain heat at such uniform rate as, one after another and in order from rear to front of the train, to call for re-energization at such short intervals as to effect a combination of surges, the chance does remain. When the desire to eliminate this remote contingency is sufficient to justify the slightly greater complication necessary for its elimination, the arrangement of Fig. 2 is provided.

Fig. 2 differs from Fig. 1 mainly in that two separate control lines are used, whereas in Fig. 1, the feeder 1 is used as the return of the control circuit. In Fig. 2, the line 34 serves as the control return; it is energized by jumper J in the last car of the train where it is connected to feeder 1. The only changes required in the wiring of the cars are (a) the removal of gap 10—11 from line 6a (b) the inclusion of this gap in line 34 and (c) the connection of lines 6 and 14 to the control return 34 instead of directly to feeder 1, as in Fig. 1.

In Fig. 2, the progression of energization is from line 3 through relay 5 to line 6a, effecting the closure of switch M (if demanded by a closed thermostat T) and, after a suitable delay, through relay 13 as before. During the period of excess current in branch B, relay A will open gap 10—11 of control line 34. This will de-energize all that portion of 34 to the left of this gap and, in the drawing, will de-energize 6 and allow relay 5 to drop back to full-open position, opening gap 7—8, thus opening all relays 5 and 13 to the right thereof.

In other words, the opening of gap 10—11 in any car will open all relays 5 and 13 to the left of that car; the opening of any relay 5 or 13 will open all relays 5 and 13 to the right thereof; which is to say that all relays 5 and 13 in the train will be opened by the opening of any gap 10—11. Hence no car may be energized until after the dissipation of the surge due to a previous energization. After gap 10—11 closes, line 3 will be again re-energized in successive steps exactly as above described in the original energization, picking up each branch in succession which may call for re-energization. It may be repeated here that any branch which may have been operating before gap 10—11 was opened will be unaffected by de-energization and re-energization of the control line since such branch, when once connected to the feeder lines through switch M, is maintained so by coil 20 through the circuit 1, 23, 22, 21, T, 20, 24, M, 27 and 2.

The invention in its broader aspects is not limited to the specific mechanisms shown and described but departures may be made therefrom within the scope of the accompanying claims without departing from the principles of the invention and without sacrificing its chief advantages.

What I claim is:

1. A system for distributing electric power comprising a feeder circuit which is continuously energized throughout when said system is in operation, a plurality of branch circuits distributed along said feeder circuit and adapted to be energized therefrom, a control circuit normally continuously energized throughout from said feeder circuit, means adapted to be actuated by current in said control circuit for separately connecting each branch circuit to said feeder circuit, and means controlled by the current in each said branch circuit for opening said control circuit when the current in that branch circuit substantially exceeds a predetermined volume.

2. A system for distributing electric power comprising a feeder circuit which is continuously energized throughout when said system is in operation, a plurality of branch circuits distributed along said feeder circuit and adapted to be energized therefrom, a control circuit comprising a plurality of sections corresponding to and associated with said branch circuits, and means associated with each branch circuit and actuated by current from said feeder circuit for progressively energizing consecutive sections of said control circuit when said feeder circuit is initially energized.

3. A system for distributing electric power comprising a feeder circuit which is continuously energized throughout when said system is in operation, a plurality of branch circuits distributed along said feeder circuit and adapted to be energized therefrom, a control circuit normally continuously energized throughout from said feeder circuit, means adapted to be actuated by current in said control circuit for separately connecting each branch circuit to said feeder circuit, and means controlled by the current in each said branch circuit for opening said control circuit when the current in that branch circuit substantially exceeds a predetermined volume and thereafter closing said control circuit when the current in that branch circuit is reduced to said predetermined volume.

4. The system as set forth in claim 2 including means for interposing an appreciable time delay between the energization of consecutive sections of said control circuit.

5. A system for distributing electric power comprising a feeder circuit which is continuously energized throughout when said system is in operation, a plurality of branch circuits distributed along said feeder circuit and adapted to be energized therefrom, a control circuit comprising a plurality of sections corresponding to and associated with said branch circuits, means associated with each branch circuit and actuated by current from said feeder circuit for progressively energizing consecutive sections of said control circuit when said feeder circuit is initially energized, and means associated with each branch circuit and operatively controlled by the current therein for halting the progressive energization of the sections of said control circuit when said current exceeds a predetermined volume.

6. A system for distributing electric power comprising a plurality of electrically articulated sections, each section comprising a portion of a common feeder circuit which is continuously energized when said system is in operation, a branch circuit adapted to be energized from said feeder circuit, a portion of a common control circuit for controlling the energization of said branch circuit, means actuated by current in said feeder circuit for energizing said portion of said control circuit when the portion of said control circuit in one of the next adjacent sections is energized, and a second means for energizing said portion of said control circuit when the portion of said control circuit in the other, next adjacent section is energized.

7. A system for distributing electric power comprising a feeder circuit which is continuously energized throughout when said system is in operation, a plurality of branch circuits distributed along said feeder circuit and adapted to be energized therefrom, a control circuit adapted to be energized from said feeder circuit and comprising a plurality of sections, one for each of said branch circuits, means for progressively energizing said sections, means associated with each branch circuit and adapted to be actuated by current in said control circuit for energizing its associated branch circuit, and means controlled by the current in a branch circuit for halting the progressive energization of the control circuit while the current in said branch circuit exceeds a predetermined maximum.

8. A system for distributing electric power comprising a source of power, feeder lines which are continuously energized throughout from said power source when said system is in operation, a plurality of branch circuits distributed along said feeder lines and adapted to be energized therefrom, means for electrically connecting each branch circuit with said feeder lines, control lines comprising a plurality of sections corresponding to and associated with said branch circuits for actuating said last mentioned means, and means for energizing said control lines progressively from section to section, in the order of the distance of their associated branch circuits from said power source.

TANDY A. BRYSON.